(12) United States Patent
Faiola

(10) Patent No.: US 10,563,384 B2
(45) Date of Patent: Feb. 18, 2020

(54) QUICK CLEAN FAUCET

(71) Applicant: Norman Faiola, Ithaca, NY (US)

(72) Inventor: Norman Faiola, Ithaca, NY (US)

(*) Notice: Subject to any disclaimer, the term of this patent is extended or adjusted under 35 U.S.C. 154(b) by 294 days.

(21) Appl. No.: 15/593,528

(22) Filed: May 12, 2017

(65) Prior Publication Data

US 2018/0328010 A1 Nov. 15, 2018

(51) Int. Cl.
| | | |
|---|---|---|
| E03C 1/04 | (2006.01) | |
| B05B 1/20 | (2006.01) | |
| B08B 3/02 | (2006.01) | |
| A23N 12/02 | (2006.01) | |
| B05B 1/16 | (2006.01) | |
| B05B 1/30 | (2006.01) | |
| B05B 15/652 | (2018.01) | |
| B05B 1/18 | (2006.01) | |

(52) U.S. Cl.
CPC ............ *E03C 1/0404* (2013.01); *A23N 12/02* (2013.01); *B05B 1/20* (2013.01); *B08B 3/02* (2013.01); *E03C 1/0405* (2013.01); *B05B 1/16* (2013.01); *B05B 1/18* (2013.01); *B05B 1/3026* (2013.01); *B05B 15/652* (2018.02); *E03C 2001/0418* (2013.01); *E03C 2201/30* (2013.01); *Y10T 137/9464* (2015.04)

(58) Field of Classification Search
CPC ............ Y10T 137/9464; E03C 1/0404; E03C 1/0405; E03C 2001/0418; E03C 2201/30; A23N 12/02; B05B 1/20; B05B 3/02; B05B 15/652; B05B 1/16; B05B 1/18; B05B 1/3026
See application file for complete search history.

(56) References Cited

U.S. PATENT DOCUMENTS

| | | | | |
|---|---|---|---|---|
| 3,112,073 A | * | 11/1963 | Larson | E03C 1/0408 239/446 |
| 3,144,878 A | * | 8/1964 | Williams | E03C 1/08 137/625.31 |
| 3,402,892 A | * | 9/1968 | Ayrial | A45D 19/00 239/312 |
| 3,471,872 A | * | 10/1969 | Symmons | E03C 1/0408 137/118.07 |
| 3,847,150 A | * | 11/1974 | Scheuermann | A61M 3/025 604/84 |
| 4,030,360 A | * | 6/1977 | Fortune | G01K 13/02 374/147 |
| 4,209,132 A | * | 6/1980 | Kwan | A61H 23/04 239/381 |

(Continued)

*Primary Examiner* — Marina A Tietjen
*Assistant Examiner* — Frederick D Soski
(74) *Attorney, Agent, or Firm* — Bond Schoeneck & King, PLLC; David Nocilly; George McGuire

(57) ABSTRACT

A faucet having a series of nozzles positioned longitudinally along the length of a spray arm to provide a robust and thorough delivery of water for the washing of produce. A thermometer may be integrated into the faucet to provide water temperature readings from various locations along the faucet. A valve allows for the nozzles to be turned on or off as desired by a user. The nozzles of the faucet provide a robust spray over the area under faucet, thereby improving the rinsing of produce. The thermometer allows a user to ensure that produce is washed at the correct temperature to open stomata and remove any trapped bacteria or other harmful items.

18 Claims, 3 Drawing Sheets

(56) References Cited

U.S. PATENT DOCUMENTS

| | | | | |
|---|---|---|---|---|
| 5,096,503 A * | | 3/1992 | Wellman | A61F 5/445 134/167 R |
| 5,158,234 A * | | 10/1992 | Magnenat | B05B 1/1618 239/447 |
| 5,535,779 A * | | 7/1996 | Huang | E03C 1/041 137/551 |
| 5,833,192 A * | | 11/1998 | Buhrman | E03C 1/06 248/295.11 |
| 6,227,456 B1 * | | 5/2001 | Colman | E03C 1/0404 239/1 |
| 6,270,022 B1 * | | 8/2001 | Knapp | B05B 7/0425 239/428.5 |
| D473,285 S * | | 4/2003 | Fan | D23/213 |
| 6,584,991 B1 * | | 7/2003 | Ries | A23N 12/02 134/122 R |
| 6,742,725 B1 * | | 6/2004 | Fan | B05B 1/083 239/447 |
| 6,962,298 B1 * | | 11/2005 | Martin | A61H 9/005 239/124 |
| 7,143,961 B1 * | | 12/2006 | Wu | E03C 1/0408 239/446 |
| 9,399,860 B2 * | | 7/2016 | Lev | E03C 1/0408 |
| 10,358,365 B2 * | | 7/2019 | Tabata | B05B 3/06 |
| 10,398,283 B2 * | | 9/2019 | Feddema | A47L 15/23 |
| 2002/0035752 A1 * | | 3/2002 | Gransow | A47K 3/28 4/601 |
| 2002/0066139 A1 * | | 6/2002 | David | E03C 1/0404 4/591 |
| 2003/0132316 A1 * | | 7/2003 | Saunders | B05B 3/16 239/463 |
| 2003/0201348 A1 * | | 10/2003 | Kao | B05B 15/652 239/587.1 |
| 2004/0118949 A1 * | | 6/2004 | Marks | B05B 15/62 239/550 |
| 2004/0124284 A1 * | | 7/2004 | Melendez | B05B 1/202 239/566 |
| 2005/0284962 A1 * | | 12/2005 | Mukai | B05B 3/013 239/525 |
| 2006/0060678 A1 * | | 3/2006 | Mazzola | B05B 1/18 239/552 |
| 2006/0144966 A1 * | | 7/2006 | Schwegler | B05B 7/0416 239/554 |
| 2007/0022529 A1 * | | 2/2007 | Thorne | E03C 1/0404 4/678 |
| 2007/0119989 A1 * | | 5/2007 | Nagano | E03C 1/023 239/526 |
| 2007/0158460 A1 * | | 7/2007 | Lev | B05B 1/1672 239/132.1 |
| 2007/0235562 A1 * | | 10/2007 | Lo | B05B 1/3026 239/390 |
| 2007/0277855 A1 * | | 12/2007 | DiPanni | A23N 12/02 134/25.3 |
| 2008/0022450 A1 * | | 1/2008 | Tsai | E03C 1/023 4/570 |
| 2008/0203186 A1 * | | 8/2008 | Grocke | B05B 1/202 239/70 |
| 2008/0315013 A1 * | | 12/2008 | Barniak, Jr. | B05B 11/3032 239/284.1 |
| 2009/0206180 A1 * | | 8/2009 | Wilson | B05B 1/1672 239/525 |
| 2009/0289129 A1 * | | 11/2009 | Qiu | B05B 1/1618 239/550 |
| 2009/0293189 A1 * | | 12/2009 | Somerville | B05B 1/18 4/597 |
| 2010/0090025 A1 * | | 4/2010 | Gerard | B05B 15/70 239/204 |
| 2010/0132612 A1 * | | 6/2010 | Achrainer | B05B 1/3053 118/696 |
| 2010/0314472 A1 * | | 12/2010 | Lee | B05B 1/18 239/553 |
| 2011/0147286 A1 * | | 6/2011 | Mang | C02F 1/003 210/137 |
| 2011/0203619 A1 * | | 8/2011 | Kara | A47L 15/22 134/174 |
| 2012/0175431 A1 * | | 7/2012 | Althammer | B08B 3/024 239/263 |
| 2012/0266376 A1 * | | 10/2012 | Marty | B05B 1/185 4/615 |
| 2012/0325353 A1 * | | 12/2012 | Zhou | B05B 1/1618 137/625 |
| 2013/0140381 A1 * | | 6/2013 | Zhou | B05B 1/1654 239/443 |
| 2013/0200176 A1 * | | 8/2013 | Alcamo | B05B 1/14 239/245 |
| 2014/0054398 A1 * | | 2/2014 | Lev | B05B 1/185 239/443 |
| 2014/0263759 A1 * | | 9/2014 | Schwartau | B05B 1/20 239/557 |
| 2015/0096116 A1 * | | 4/2015 | Doss | E03C 1/023 4/570 |
| 2015/0275451 A1 * | | 10/2015 | Sorstrom | E02B 15/041 239/1 |
| 2015/0360243 A1 * | | 12/2015 | Soetaert | B05B 1/18 4/615 |
| 2015/0360244 A1 * | | 12/2015 | Scheelhaase | B05B 1/20 239/562 |
| 2016/0114342 A1 * | | 4/2016 | Wang | B08B 9/0936 239/222.13 |
| 2017/0087570 A1 * | | 3/2017 | Ukigai | B05B 1/185 |
| 2017/0167121 A1 * | | 6/2017 | Lin | B05B 1/18 |
| 2017/0173603 A1 * | | 6/2017 | Lin | B05B 1/1663 |
| 2017/0216854 A1 * | | 8/2017 | Thurgood | A01K 13/001 |
| 2017/0348718 A1 * | | 12/2017 | Preheim | B05B 12/008 |
| 2018/0172264 A1 * | | 6/2018 | Heuer | A61L 2/10 |
| 2018/0221894 A1 * | | 8/2018 | Forgey | B05B 1/169 |
| 2018/0298596 A1 * | | 10/2018 | Tsai | E03C 1/0408 |
| 2018/0313070 A1 * | | 11/2018 | Zhang | B05B 1/00 |
| 2018/0318850 A1 * | | 11/2018 | Wen | B05B 1/20 |
| 2019/0104917 A1 * | | 4/2019 | Fasson | A47L 17/04 |

* cited by examiner

QUICK CLEAN FAUCET

BACKGROUND OF THE INVENTION

1. Field of the Invention

The present invention relates to faucets and, more specifically, to a faucet having multiple spray nozzles for use in cleaning produce.

2. Description of the Related Art

Recent food safety issues have made the proper washing of food, such as produce, a high priority particularly in commercial establishments. In addition to thorough washing, specifications for produce suggest rinse temperature of two to five degrees Fahrenheit higher than the produce (which is usually 41° F. when removed from refrigeration) to open up the stomata on the underside of leaves where bacteria may have become lodged during harvesting warm and then trapped when the produce was cooled for shipment. Accordingly, there is a need in the art for a system for washing produce that can more effectively control the temperature of wash water and ensure a robust deliver of water for washing.

BRIEF SUMMARY OF THE INVENTION

The present invention comprises a faucet having a series of nozzles positioned longitudinally along the length of a spray arm to provide a robust and thorough delivery of water for the washing of produce. A thermometer may be integrated into the faucet to provide water temperature readings from various locations along the faucet. A valve allows for the nozzles to be turned on or off as desired by a user.

In a first embodiment, the invention is a faucet having a mount, an arm having a channel therein extending from the mount and having a free end, a spray head coupled to the free end, and a plurality of nozzles positioned along the arm between the mount and the spray head. A passage interconnects the nozzles. A valve is positioned in the arm and configured to selectively open and close communication between the passage and the channel. A knob is operatively associated with the valve. A thermometer is associated with the arm. The thermometer is configured to determine the temperature of any water within the channel, such as water in the passage proximate to the nozzles, water in the channel proximate to the spray head, and/or water in the channel proximate to the mount. The arm may be articulated.

In another embodiment, the invention is a method of washing an item, comprising the steps of providing a faucet having a mount, an arm having a channel therein extending from the mount and having a free end, a spray head coupled to the free end, and a plurality of nozzles positioned along the arm between the mount and the spray head, positioning the item to be washed at least partially under the nozzles, and allowing water to flow through the arm of the faucet and through the nozzles onto the item to be washed. The method further comprises the step of using a thermometer to determine a temperature of water flowing through the faucet. The method additionally comprises the step of setting the temperature of water flowing through the faucet to a predetermined temperature prior to the step of allowing water to flow through the arm of the faucet and through the nozzles onto the item to be washed. The method additionally comprises the step of operating a valve of the faucet to direct water to the nozzles once water has reached the predetermined temperature. The step of operating the valve of the faucet to direct water to the nozzles once water has reached the predetermined temperature comprises moving a knob operatively associated with the valve.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
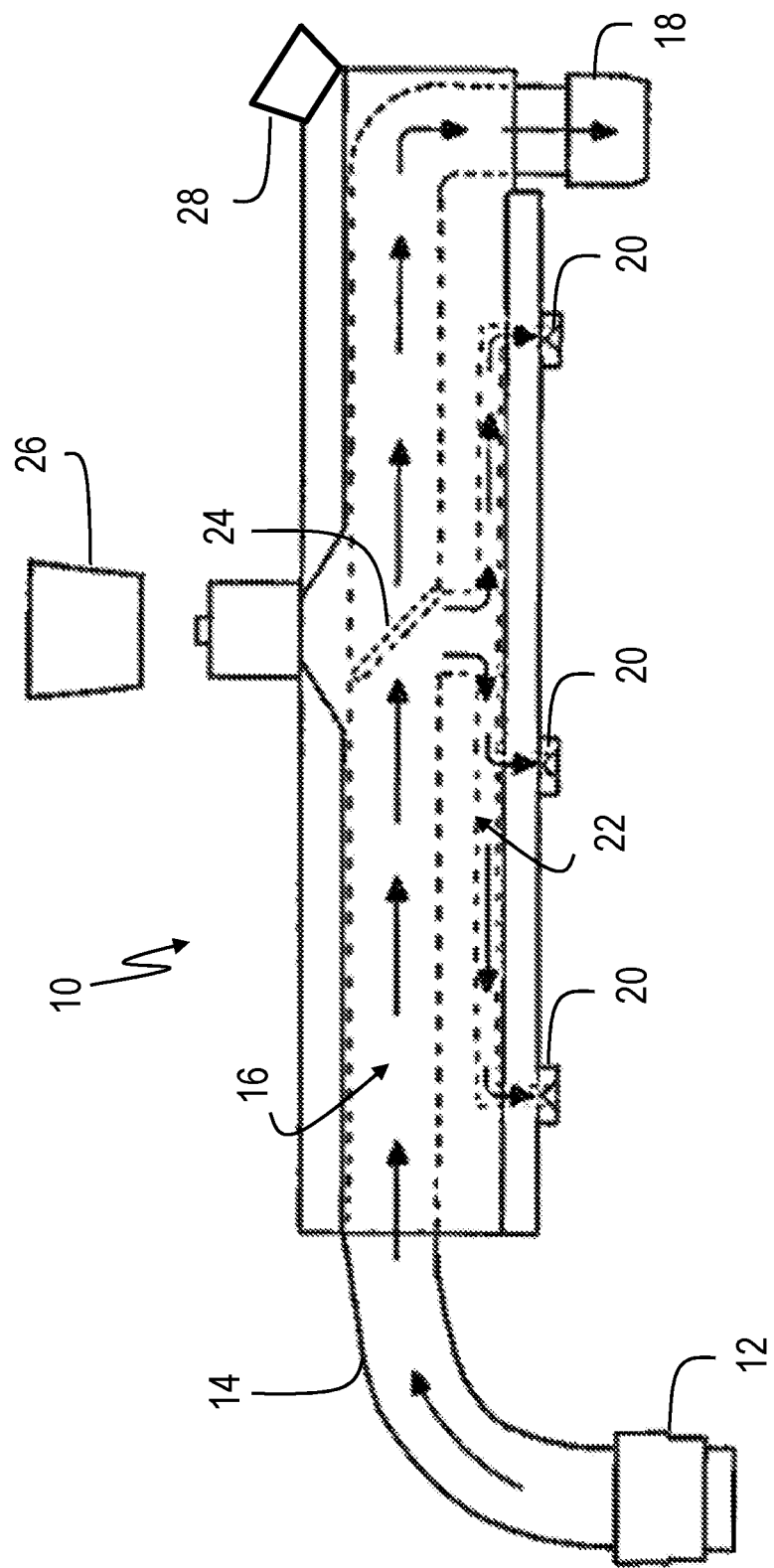
FIG. 1 depicts a faucet according to the present invention with a flow path in dashed lines.
Figure 2:
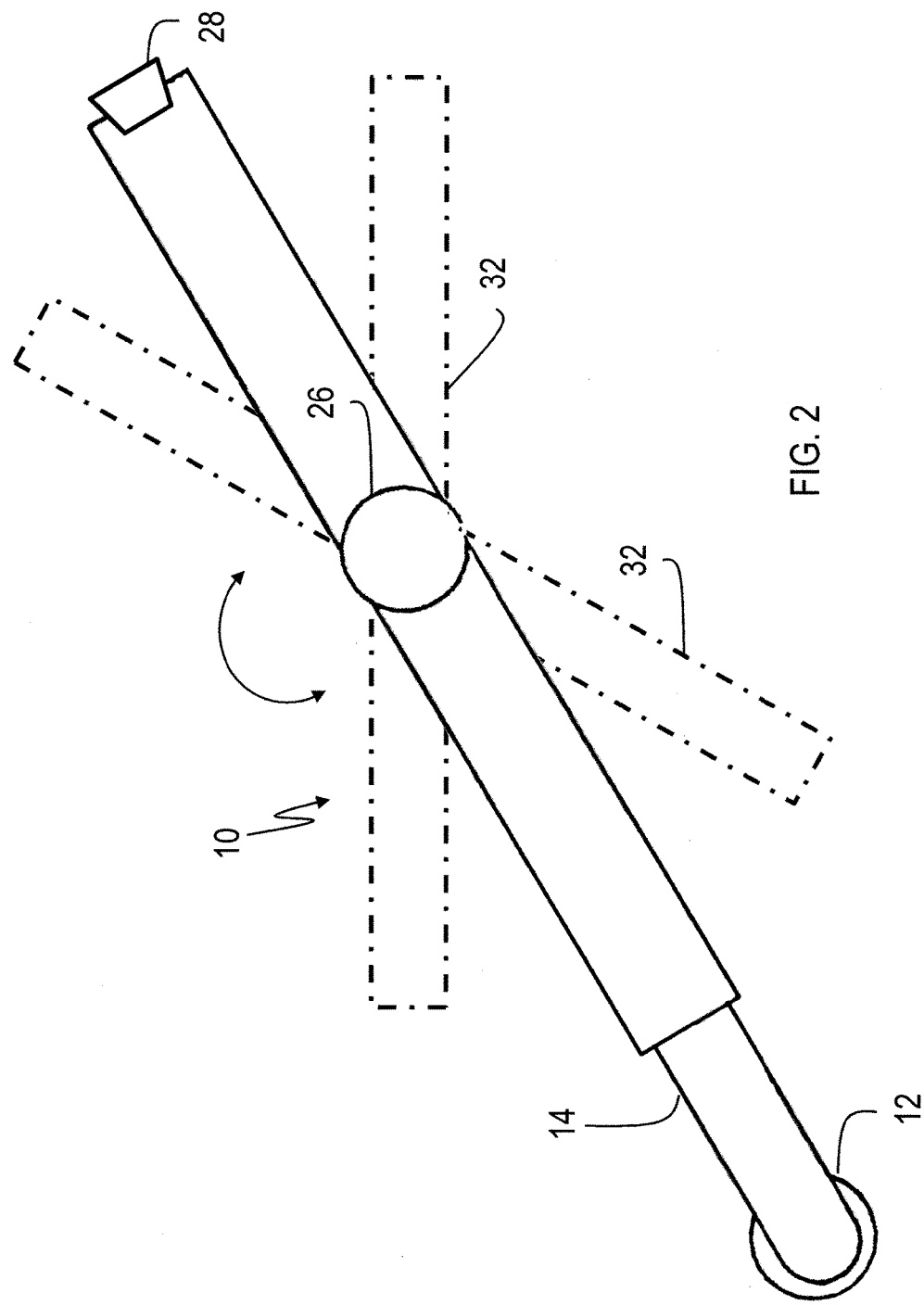
FIG. 2 depicts a faucet having a second arm that rotates relative to a first arm according to the present invention.

Referring to the figures, wherein like numerals refer to like parts throughout, there is seen in FIGS. 1 and 2 a faucet 10 for use in rapidly and thoroughly washing produce and related items. Faucet 10 extends from a mount 12 that may be connected to a conventional sink or wash basis having a water supply as is known in the art. Faucet 10 includes an arm 14 extending from mount 12 having a channel 16 formed therein for the flow of water. Arm 14 is preferably pivotally coupled to mount 12 so that arm 14 can swivel about a vertical axis. Arm 14 may also be articulated with one or more joints as is known in the art to provide for a greater reach and range of motion. Mount 12 may include an adjustable gate valve to control in-bound water flow regardless of any other controls associated with water supply. Arm 14 terminates in spray head 18 for delivering water to a desired location. Spray head 18 may be selectable between spray and high volume flow settings. Hollow arm 16 further comprises a series of nozzles 20 spaced longitudinally along a predetermined length of arm 16. Nozzles 20 are configured to provide a vigorous spray from water supply along a large portion of the area under faucet 10 so that any produce positioned thereunder is fully and adequately rinsed.

Nozzles 18 are interconnected to a common passage 22 that may be selectively placed into and out of fluid communication with channel 16 by a valve 24. Passage 22 may additionally include a venturi and associated dip tube for withdrawing a second liquid from a supply tank, such as a cleaning fluid or sanitizer, and mixing it with the water supply for delivery out of nozzles 20. Valve 24 is drivable by a user knob 26 positioned externally of arm 16 so that a user can selectively connect or disconnect nozzles 20 from the water supply. A thermometer 28 may be positioned at a predetermined location of arm 16 and oriented to provide a user with a visual indication of the temperature of the water supply when faucet 10 is in use. Thermometer 28 preferably senses the temperature at multiple locations, such as at mount 12, along arm 14, at spray head 18, and/or at nozzles 20.

Figure 3:
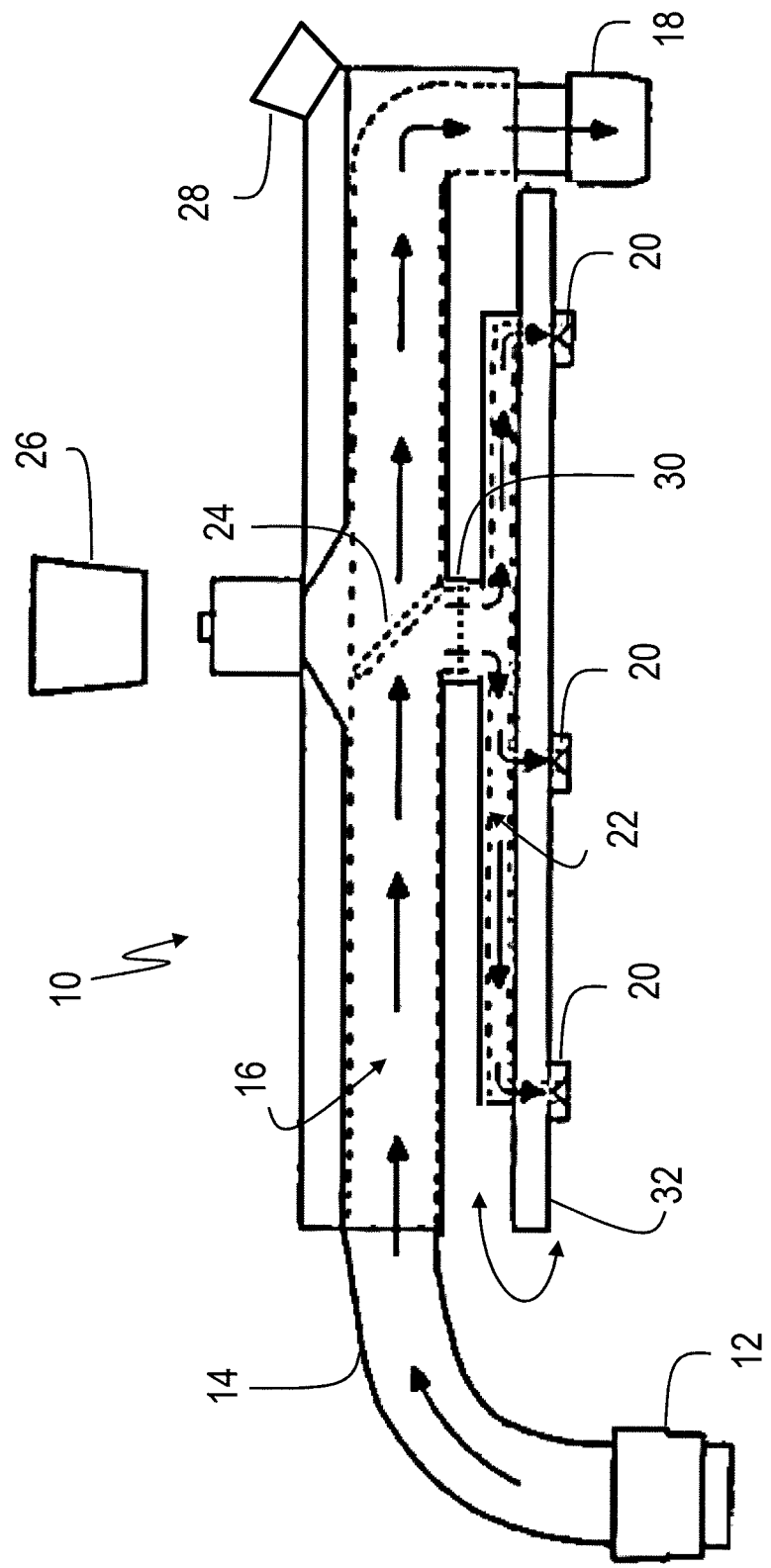
FIG. 3 depicts a faucet having a second arm that rotates relative to a first arm according to the present invention with a flow path in dashed lines.

Referring to FIG. 3, faucet 10 may be configured so that nozzles 20 and passage 22 are housed on a second arm 32 independently from arm 16 and attached thereto via pivotal connection 30. In this embodiment, nozzles 20 on second arm 32 may be rotated through 360 degrees and thus into any position relative to the longitudinal axis of arm 16, as seen in the phantom lines of FIG. 2.

In use, faucet 10 may be positioned over produce to be washed and the water supply turned on. When the water is the correct temperature, as determined by thermometer 28, nozzles 20 may be activated to provide a robust spray over a larger area under faucet, thereby improving the rinsing of produce. Thermometer 28 allows the user to ensure that produce is washed at the correct temperature to open stomata and remove any trapped bacteria or other harmful substances. The design of faucet 10 allows for hands free and more efficient rinsing of products than otherwise available when operating one-handed when using an overhead sprayer arm that needs one hand to control. Faucet 10 will additionally improve the cleaning and rinsing of pots and pans by providing a better distribution of water and freeing both hands of the user for cleaning.

What is claimed is:

1. A faucet, comprising:
    a mount;
    a first arm having a channel therein extending from the mount along a longitudinal axis and having a free end;
    a spray head coupled to the free end; and
    a plurality of nozzles positioned along a second arm, wherein the second arm rotates in relation to the first arm; and
    a valve positioned in the first arm and configured to selectively open and close communication to the plurality of nozzles.

2. The faucet of claim 1, further comprising a passage interconnecting the nozzles.

3. The faucet of claim 2, further comprising a thermometer associated with the arm.

4. The faucet of claim 3, wherein the thermometer is configured to determine the temperature of any water within the channel.

5. The faucet of claim 4, wherein the thermometer is configured to determine the temperature of any water in the passage proximate to the nozzles.

6. The faucet of claim 5, wherein the thermometer is configured to determine the temperature of any water in the channel proximate to the spray head.

7. The faucet of claim 6, wherein the thermometer is configured to determine the temperature of any water in the channel proximate to the mount.

8. The faucet of claim 7, wherein the arm is articulated.

9. A method of washing an item, comprising the steps of:
    providing a faucet having a mount, an arm having a channel therein extending from the mount along a longitudinal axis and having a free end, a spray head coupled to the free end, and a plurality of nozzles positioned along a second arm, wherein the second arm rotates in relation to the first arm, a valve positioned in the second arm and configured to selectively open and close communication to the plurality of nozzles;
    rotating the second arm in relation to the first arm;
    positioning the item to be washed at least partially under the nozzles; and
    allowing water to flow through the arm of the faucet and through the nozzles onto the item to be washed.

10. The method of claim 9, wherein the faucet further comprises a thermometer associated with the arm.

11. The method of claim 10, further comprising the step of using the thermometer to determine a temperature of water flowing through the faucet.

12. The method of claim 11, further comprising the step of setting the temperature of water flowing through the faucet to a predetermined temperature prior to the step of allowing water to flow through the arm of the faucet and through the nozzles onto the item to be washed.

13. The method of claim 12, further comprising the step of operating a valve of the faucet to direct water to the nozzles once water has reached the predetermined temperature.

14. The method of claim 13, wherein the step of operating the valve of the faucet to direct water to the nozzles once water has reached the predetermined temperature comprises moving a knob operatively associated with the valve.

15. The method of claim 14, wherein the thermometer is configured to determine the temperature of water within the channel.

16. The method of claim 15, wherein the thermometer is configured to determine the temperature of water in the passage proximate to the nozzles.

17. The method of claim 16, wherein the thermometer is configured to determine the temperature of any water in the channel proximate to the spray head.

18. The method of claim 17, wherein the thermometer is configured to determine the temperature of any water in the channel proximate to the mount.

* * * * *